United States Patent
Tatewaki et al.

(10) Patent No.: US 7,012,384 B2
(45) Date of Patent: Mar. 14, 2006

(54) ILLUMINATION DEVICE FOR VEHICLE COMPARTMENT

(75) Inventors: Yasumasa Tatewaki, Aichi (JP); Satoshi Inagaki, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 48 days.

(21) Appl. No.: 10/348,762

(22) Filed: Jan. 23, 2003

(65) Prior Publication Data

US 2003/0156422 A1 Aug. 21, 2003

(30) Foreign Application Priority Data

Jan. 25, 2002 (JP) .......................... P2002-017452

(51) Int. Cl.
*H05B 37/00* (2006.01)
*H01L 27/14* (2006.01)

(52) U.S. Cl. .................. 315/323; 315/360; 315/322; 315/312; 362/800; 362/612; 362/806

(58) Field of Classification Search ............ 315/185 S, 315/200 A, 312, 324, 323, 325, 360, 322, 315/316; 362/800, 806, 612
See application file for complete search history.

(56) References Cited

U.S. PATENT DOCUMENTS

| | | | | |
|---|---|---|---|---|
| 5,831,389 A | * | 11/1998 | Kawashima et al. | 315/77 |
| 5,866,994 A | * | 2/1999 | Nakano | 315/362 |
| 6,152,590 A | | 11/2000 | Furst et al. | 362/545 |
| 6,495,973 B1 | * | 12/2002 | Allen, Jr. | 315/302 |
| 6,552,668 B1 | * | 4/2003 | Berezovsky | 340/929 |
| 6,657,393 B1 | * | 12/2003 | Natsume | 315/82 |
| 2001/0012206 A1 | * | 8/2001 | Hayami et al. | 362/464 |
| 2003/0011325 A1 | * | 1/2003 | Pi | 315/291 |
| 2005/0206589 A1 | * | 9/2005 | Miyachi et al. | 345/73 |

FOREIGN PATENT DOCUMENTS

| | | |
|---|---|---|
| JP | 05-046576 | 6/1993 |
| JP | 10-166940 | 6/1998 |

* cited by examiner

*Primary Examiner*—Tuyet Thi Vo
(74) *Attorney, Agent, or Firm*—McGinn IP Law Group, PLLC

(57) ABSTRACT

An illumination device having a first light source, a second light source, whose luminous color differs from that of said first light source, and a controller for controlling the illuminating condition of each of the first light source and the second light source is configured. The controller turns on the first light source so that the light intensity of the first light source gradually increases at an early stage of a turning-on operation. Moreover, the controller turns on the second light source when the light intensity of the first light source gradually increases after a lapse of a predetermined time from the start of the turning-on of the first light source.

17 Claims, 3 Drawing Sheets

ILLUMINATION DEVICE FOR VEHICLE COMPARTMENT

The present application is based on Japanese Patent Application No. 2002-17452, the entire contents of which are incorporated herein by reference.

BACKGROUND OF THE INVENTION

1. Field of the Invention

This invention relates to an illumination device for a vehicle compartment. More particularly, this invention relates to an illumination device for illuminating the interior of a vehicle compartment, for example, when an occupant gets on and off the vehicle. The illumination device according to the invention can be utilized as, for instance, a room lamp, which is installed on a roof portion in a vehicle compartment, and a door courtesy-lamp installed on each-of vehicle doors.

2. Related Art

An illumination device (that is, a room lamp) for illuminating a vehicle compartment in the night is installed on the roof portion in the interior of an automobile. Such a room lamp incorporates a light source adapted to perform turning on and off operations by linking such operations with opening and shutting motions of a door. When the automobile is in a state in which one of the doors thereof is opened (that is, when an occupant gets on or off the automobile), the room lamp illuminates the interior thereof to thereby assist the occupant to safely get on or off the automobile.

Meanwhile, it is desired to provide a room lamp enabled to have a high degree of a presentation effect or decoration effect of light in addition to the illuminating function. Conventional room lamps adapted to perform a presentation (that is, a fade-in), in which it becomes gradually lighter in a vehicle compartment, for example, when a door is opened, and a presentation (that is, a fade-out), in which conversely, it becomes gradually darker therein when the door is opened, have been put into practical use as a means for meeting such a demand. Although such a room lamp can obtain the decoration effects to some extent owing to illumination change, the representation effects are low. Further, the illuminating manner thereof lacks-in a feeling of luxury.

On the other hand, a conventional method enabled to enhance presentation effects by linking the turning-on of the room lamp with that of another illumination device, such as a door courtesy lamp, has been proposed (see Japanese Utility Model Publication No. JP-U-5-46576). However, such a conventional method simply causes a change of a place, to which light is radiated, according to the state of a door. Thus, this conventional method cannot obtain decoration effects so much.

Additionally, there has been proposed a conventional room lamp system adapted to change the color of illuminating light according to the state of a vehicle, which is changed between a door-opened state and a door-closed state, by using a white light lamp and a color light lamp as light sources and by controlling the illuminating condition of these lamps (see Japanese Patent Publication No JP-A-10-166940). Such a conventional room lamp system illuminates the interior of the vehicle with different colors of the illuminating light according to the state of the door. Thus, this conventional room lamp system achieves decoration effects. However, while this conventional room lamp system achieves unexpected presentation effects owing to an instantaneous changeover from white light illumination to color light illumination, performed in the door-opened state and in the door-closed state respectively, such the presentation effect is far from a desirable one in terms of feeling of luxury.

SUMMARY OF THE INVENTION

The invention is accomplished in view of the aforementioned problems of the conventional method and system. Accordingly, an object of the invention is to provide an illumination device for a vehicle compartment, which is enabled to have a high degree of a presentation effect and much feeling of luxury.

To achieve the foregoing object, according to an aspect of the invention, there is provided an illumination device for a vehicle compartment, which has a first light source, a second light source, a luminous color of which is different from that of the first light source, and a controller for controlling an illuminating condition of each of the first light source and the second light source. In this illumination device, the controller turns on the first light source so that light intensity of the first light source gradually increases at an early stage of a turning-on operation. Moreover, the controller turns on the second light source when the light intensity of the first light source gradually increases after a lapse of a predetermined time from starting a turning-on of the first light source.

With the aforementioned configuration, what is called a fade-in effect is obtained by controlling a turning-on operation of the first light source so that the light intensity of the first light source gradually increases at an early stage of the turning-on operation. Further, the second light source, a luminous color of which is different from that of the first light source, is turned on when the light intensity of the first light source gradually increases after a lapse of a predetermined time from the start of the turning-on of the first light source. Consequently, the light radiated from the first light source is mixed with light radiated from the second light source, so that the color tone of illuminating light changes. Thus, the tone of the illuminating light can be changed in the course of a turning-on operation by using the second light source, a luminous color of which is different from that of the first light source, and delaying starting the turning-on of the second light source. Hence, an illuminating manner providing a high degree of a presentation effect can be produced. Further, the change in this color tone is combined with the fade-in effect corresponding to the first light source to thereby realize an illuminating manner that has much feeling of luxury.

Preferably, the second light source is controlled so that the light intensity thereof gradually increases at an early stage of the lighting-on thereof. Thus, the fade-in effect corresponding to the second light source can be obtained. Consequently, the presentation effect is enhanced still more by combining the fade-in effects respectively corresponding to the first and second light sources. Hence, an illuminating manner having more of feeling of luxury is produced.

Preferably, as a control operation to be performed at the turning-off of the light source, the controller turns off the first light source so that the light intensity thereof gradually decreases, and also turns off the second light source during the light intensity of the first light source gradually decreases after a lapse of a predetermined time from the start of the turning-off of the first light source. Thus, the illuminating manner providing a high degree of the presentation effect is produced, similarly as that in the case of turning on the light sources. Additionally, preferably, the turning-off of the second light source is controlled so that the light intensity thereof gradually decreases. According to such a turning-off control operation, the light intensity of the first light source is first reduced. Thus, the fade-out effect is achieved. Moreover, first, a ratio of the amount of light, which is radiated from the first light source, to that of the illuminating light decreases. Thus, the color tone of the illuminating light gradually changes. Then, decrease in the light intensity of the second light source commences after a lapse of the predetermined time from the start of the first light source. Thus, the fade-out effect due to this is attained. Moreover, change in the tone is observed. Consequently, in addition to the fade-out effects respectively corresponding to the first and second light sources the apparatus achieves the presentation effect that the tone of the illuminating light gradually changes. Hence, an illuminating manner providing a higher degree of presentation effect and having a feeling of luxury is produced. Incidentally, the illumination device of the invention can be configured so that the controller performs only the aforementioned turning-off control operation.

Incidentally, the meaning of the expression "light intensity gradually increases" in the apparatus of the invention includes the cases that the light intensity increases linearly, that the light intensity increases exponentially, that the light intensity stepwise increases, and the combination of such cases. Similarly, the meaning of the expression "light intensity gradually decreases" in the apparatus of the invention includes the cases that the light intensity decreases linearly, that the light intensity decreases exponentially, that the light intensity stepwise decreases, and the combination of such cases.

The luminous color of each of the first and second light sources is not limited to a specific color. That is, chromatic such as red, green, blue, and additive colors thereamong, or white color maybe employed as the luminous color thereof. For example, chromatic color may be used as the, luminous color of the first light source, while white may be simultaneously employed as the luminous color of the second light source. In this case, when a turning-on control operation is performed by turning on the first light source so that the light intensity thereof gradually increases, and by delaying the turning-on of the second light source and then turning on the second light source so that the light intensity of the second light source gradually increases, the apparatus can achieve an illuminating manner in which chromatic color illuminating light gradually increases the intensity and in which the tone thereof gradually changes. When, for example, umber is employed as the luminous color of the first light source, a change in the tone of light as seen at a sunrise, that is, a change in the tone of light from that of red-tinged atmosphere like that of a morning glow to that of white-tinged atmosphere like that of day-light can be represented. Further, in the case where the second light source is turned off so that the light intensity thereof gradually decreases, and where the turning-off of the first light is delayed since the turning-off of the second light source and then the turning-off of the first light source is performed, the apparatus can achieve an illuminating manner in which the light intensity of the illuminating light is gradually degraded, and in which the tone thereof gradually becomes darker and darker. When, for instance, umber is employed as the luminous color of the-first light source, a change in the tone of light as seen at sunset, that is, a change in the tone of light from that of white tinged atmosphere like that of day-light to that of red-tinged atmosphere like that of an evening glow can be represented.

The kind of alight source to be used as the first and second light sources is not limited to a specific one. For example, light sources, such as LED, alight bulb, a fluorescent light, and a cooled cathode-ray tube can be used. Among such light sources, preferably, LED is used. The LED is preferable because light intensity of the emitting light can be easily changed by controlling electrical input signals to the light source itself, and the response characteristic to the signals is desirable. Further, the compactness of the LED enables the saving of space for the light sources. Thus, reduction in the size and thickness of the illumination device is achieved. Further, LED meets the energy conservation requirement because of the low power consumption thereof. Furthermore, LED, whose heating value is low, hardly affects surrounding members. Consequently, the employment of LED enables a compact design of an illumination device and enhances flexibility in mounting the illumination device. Additionally, the long life of LED is advantageous for maintenance of the apparatus. Furthermore, because of high resistance to vibrations and shocks, LED has an advantage in that a highly reliable illumination device can be configured. The type of LED is not limited to a specific one. That is, LEDs of the various types, such as what are called a shell type and a chip type, may be employed.

Fluorescent materials showing a fluorescence in response to light received from the first light source or the second light source may be used in the illumination device. The wavelength conversion of light radiated from the first light source or the second light source can be performed by using such a fluorescent material. The kind of the fluorescent material, which can be employed in the apparatus, is not limited to a specific one. Either of organic and inorganic fluorescent materials may be employed therein. Fluorescent materials showing various colors may be employed. In addition to fluorescent materials showing three optical primary colors, that is, red, green, and blue, fluorescent materials showing additive colors thereof may be also employed. Further, combinations of a plurality of fluorescent materials may be used. For instance, a mixture of a red fluorescent material, a green fluorescent material, and a blue fluorescent material may be used.

The first light source and/or the second light source may be constituted by using a plurality of light sources, such as LEDs, bulbs, fluorescent lamps, and cooled cathode ray tubes. In this case, the first light source and/or the second light source may be constituted by a combination of light sources of different kinds (for instance, a combination of LED and a bulb) or a combination of light sources, whose luminous colors differ from one another (for example, a combination of red LED and blue LED). The use of plural light sources enables enhancement of light intensity and illumination utilizing color mixture of light. Incidentally, the number of used light sources can be determined by comprehensively considering the brightness of each of the light sources and the required light intensity.

The first light source and the second light source may be provided for illuminating each of seats for occupants, such as a driver seat and an assistant driver's seat. For example, a pair of first and second light sources may be provided at each of four corners of the illumination device. Thus, the driver seat is illuminated by light radiated from each of the light sources disposed at the driver-seat-side corner portion. The illumination device of the invention may be configured so that similarly, light outputted from each of the pairs of first and second light sources disposed at the assistant driver's seat side corner, the rightward rear seat side corner and the leftward rear seat side corner is adapted to illuminate a corresponding one of the assistant driver's seat, the rightward rear seat and the leftward rear seat. A pair off first and second light sources may be provided at the central portion of the vehicle, separately from the light sources placed at the corners. The light sources provided at the central portion may be utilized for illuminating a central console apparatus and for illuminating the entire interior of the vehicle.

A light transmissible cover may be provided on the light radiation side of each of the first and second light sources. In this case, light radiated from each of the light sources is irradiated to the interior of the vehicle through the cover. The visual performance and color of light externally radiated therefrom can be changed by performing a cutting process and a coloration process on such covers. Such processes may be performed on a region of the cover to thereby cause only light radiated through the region to undergo such a change. Furthermore, the cutting process may be performed on such regions in different manners to thereby cause each of light rays radiated through the regions to show a peculiar radiation manner. A lens may be provided in addition to or instead of the cover so that light radiated from the first light source and/or the second light source is converged or diverged by this lens. Consequently, the range of irradiation of light can be adjusted and changed.

BRIEF DESCRIPTION OF THE DRAWINGS

FIG. 5A is a graph illustrating an example in which the turning-off of the first LEDs 20 precedes that of the second LEDs 21;

FIG. 5B is a graph illustrating an example in which the turning-off and turning-on of the first LED 20 are respectively performed simultaneously with those of the second LED 21 and in which the manner of change in the light intensity of the first LEDs 20 is made to differ from that of change in the light intensity of the second LEDs 21;

FIG. 5C is a graph illustrating an example in which the light intensity of each of sets of the first LEDs 20 and the second LEDs 21 at the turning-on and turning-off thereof is exponentially changed; and FIG. 5D is a graph illustrating an example in which the light intensity of the first LEDs 20 at the turning-on and turning-off thereof is stepwise changed. FIG. 5E is a graph illustrating an example in which the first LEDs 20 is once turned off after turned on.

DETAILED DESCRIPTION OF THE PREFERRED EMBODIMENTS

Hereinafter, an embodiment of the invention is described with reference to the accompanying drawings.

Figure 1:
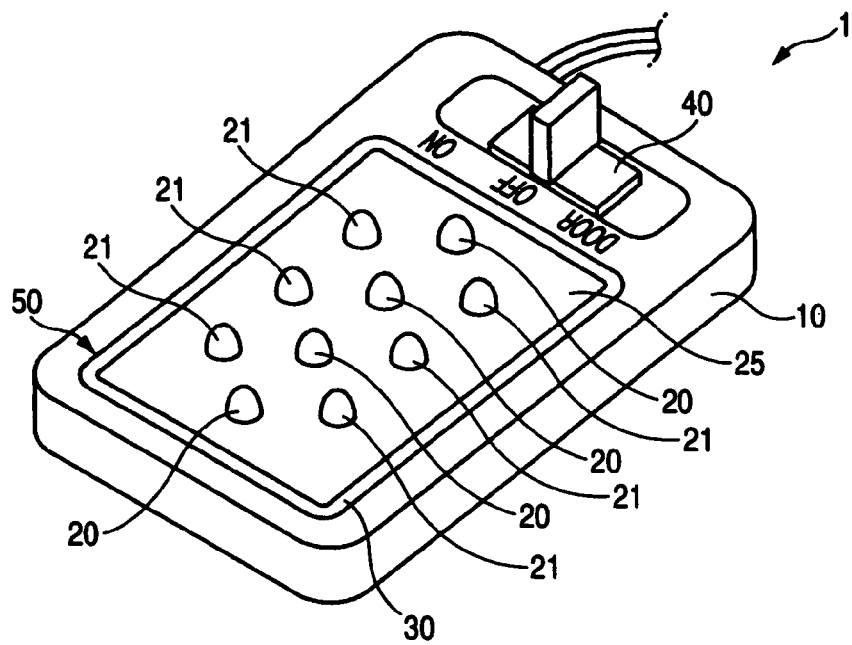
FIG. 1 is a perspective view illustrating an illumination device 1 for a vehicle compartment according to an embodiment of the invention.

FIG. 1 is a perspective view illustrating an illumination device for a vehicle compartment according to an embodiment of the invention (hereunder referred to as a "illumination device 1"). The illumination device 1 is shaped nearly like a thin plate, and has a casing 10, which has a light outputting rectangular opening part and a switching opening part in a side thereof, and also has first LEDs 20, second LEDs 21, a cover 30, and a switch 40. Each of the first LEDs 20 is of what is called the shell type and has an umber luminous color. A total of four of the first LEDs 20 are used and arranged at uniform intervals along a longitudinal axis on a nearly central part of a light emitting portion 50. Each of the second LEDs 21 is also of the shell type but has a white luminous color. A total of six of the second LEDs 21 are used, and two sets of three of the second LEDs 21 are arranged along the longitudinal axis at equal intervals. The first LEDs 20 and the second LEDs 21 are mounted on a substrate 25 so that the optical axis of each of the LEDs 20 and 21 is almost perpendicular to the cover 30. Incidentally, a control circuit (not shown) for controlling the illuminating condition of each of the first LEDs 20 and the second LEDs 21 according to the position of the switch 40 is provided on the substrate 25.

The cover 30 is made of light transmissible resin (for instance, a polycarbonate resin or an acrylic resin and has an inner side face (that is, the side face at the side of the first LEDs 20 and the second LEDs 21), on which a cutting process for light diffusion is performed.

Figure 2:
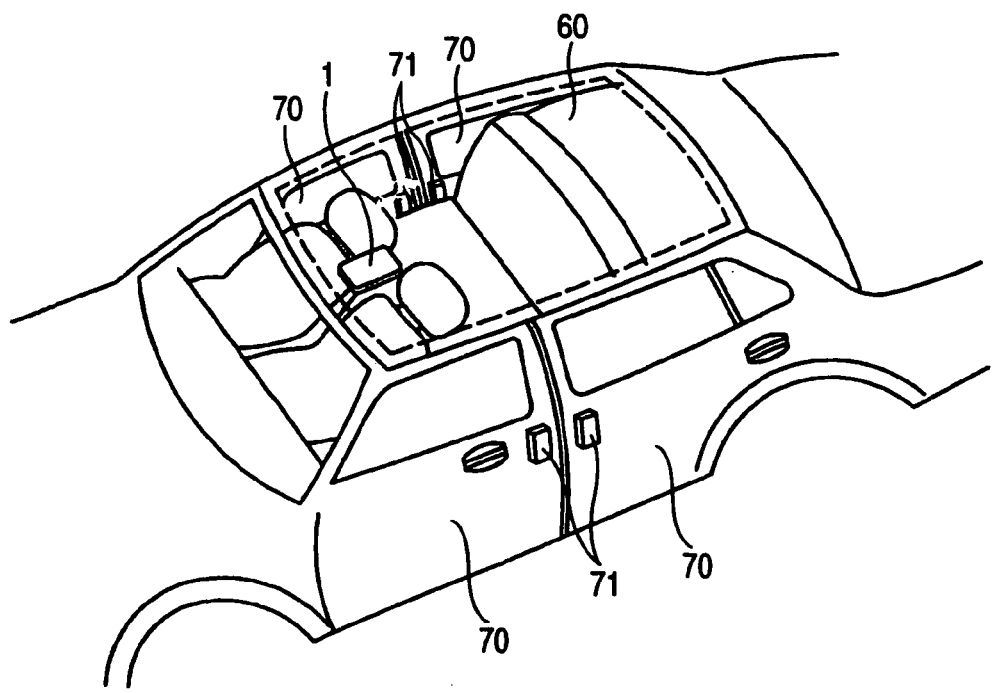
FIG. 2 is a partly perspective projection view illustrating a manner of attaching the illumination device 1 for a vehicle compartment.
Figure 3:
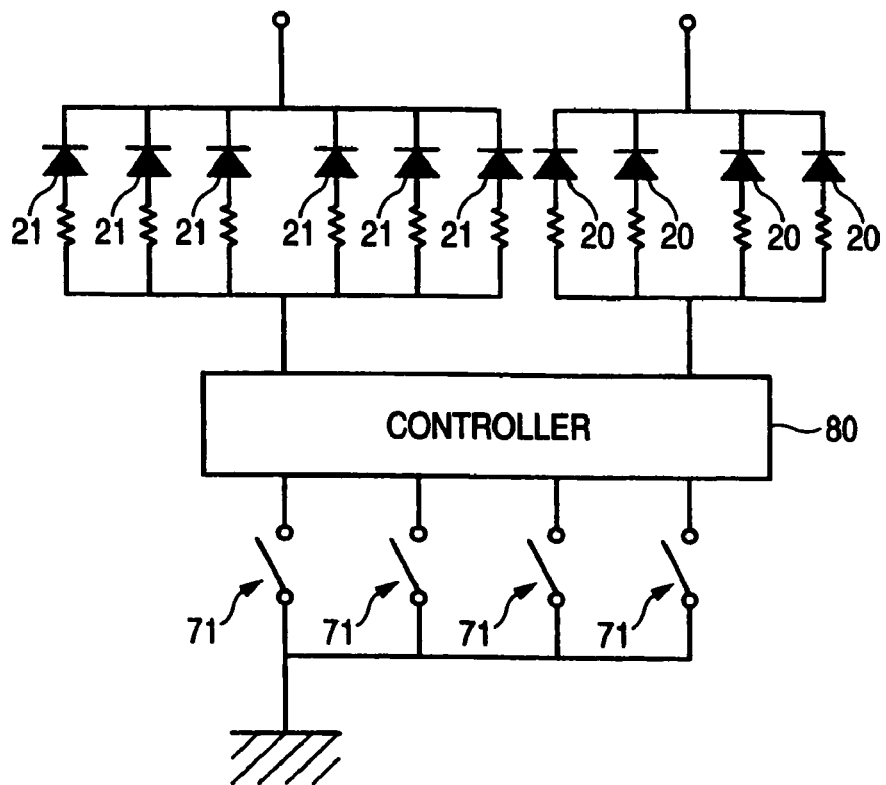
FIG. 3 is a view illustrating the circuit configuration of the illumination device 1 for a vehicle compartment.

As shown in FIG. 2, the illumination device 1 is installed nearly at the center of the roof portion 60 of the interior of the automobile so that a part of the apparatus 1, which is provided at the side of the light emitting portion 50, is placed at the interior side of the automobile.

Next, the illuminating manner, in which the illumination device 1 illuminates the interior of the automobile, is described hereinbelow with reference to FIGS. 1 to 4. First, when the switch 40 is in OFF-position, as illustrated in FIG. 1, the turning-on of the first LEDs 20 and the second LEDs 21 is not performed. Subsequently, when the switch 40 is in ON-position, a predetermined amount of electric current flows only through the second LEDs 21. Thus, the second LEDs 21 are turned on at a predetermined light intensity. The light outputted from the second LEDs 21 is diffused by the cover 30. Then, the light is externally radiated. Consequently, an automobile interior is illuminated with white light. On the other hand, during a state in which the switch 40 is in DOOR position, operations (to be described later) of controlling the turning-on and turning-off of the first LEDs 20 and the second LEDs 21, which are performed by being linked with operations of opening and closing the door.

As illustrated in FIG. 2, a door switch 71 enabled to detect an open or closed state of each of the doors 70 and to perform ON-operation during the open state of the doors 70 is attached thereto. These door switches 71 are electrically connected to a controller 80 (see FIG. 3). The controller 80 controls directly the light intensity of the LEDs 20, 21 in a electrical manner so that the illuminating condition of the first LEDs 20 and the second LEDs 21 of the illumination device 1 are controlled according to electrical input signals from the door switches 71.

Figure 4:
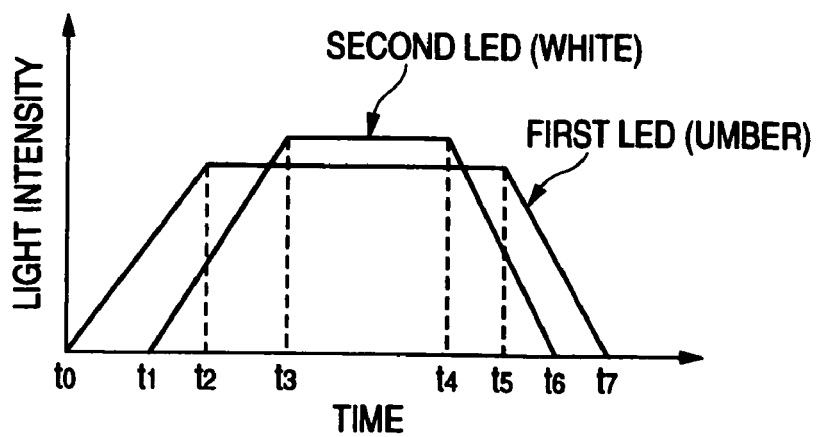
FIG. 4 is a graph illustrating a manner of change in the light intensity of each of first LEDs 20 and second LEDs 21 of the illumination device 1 for a vehicle compartment.

FIG. 4 is a graph schematically illustrating a manner in which the controller 80 controls the illuminating conditions of each of the LEDs. As illustrated in this graph, when one of the doors 70 is opened, first, the turning-on of the first LEDs 20 is commenced. The turning-on of the first LEDs 20 is performed so that the light intensity thereof gradually increases until a predetermined time (t2) elapsed from the start (t0) of the turning-on of the first LEDs 20. Thereafter, the first LEDs 20 are lighted at a constant light intensity. On the other hand, after a lapse of a predetermined time (t1) since the start (t0) of the turning-on of the first LEDs 20, the turning-on of the second LEDs 21 is commenced. Then, the light intensity of the second LEDs 21-gradually increases until a predetermined time (t3) elapses. Thereafter, the second LEDs 21 are lighted at a constant light intensity. In a predetermined time period (t0 to t1) since the start (t0) of the first LEDs 20, the automobile interior is illuminated with umber light radiated only from the first LEDs 20. Illuminance gradually increases with lapse of time. After the lapse of a time (t1), the mixing of light, which is radiated from the second LEDs 21, thereto is started. The light intensities of both sets of the first LEDs and the second LEDs gradually increase until a time (t2) elapses. Thus, in a time period between the moments t1 and t2, the color tone of the illuminating light gradually becomes lighter. Simultaneously, the luminance increases. After the lapse of the time t2, the light intensity of the first LEDs 20 is maintained at a constant level, and only the light intensity of the second LEDs 21 gradually increases. Therefore, as the luminance of the illuminating light increases, the ratio of the light intensity of white light to that of the entire illuminating light increases. Consequently, the color tone of the illuminating light becomes lighter, that is, changes closer to that of white light.

As described above, the first LEDs 20 and the second LEDs 21 are turned on so that both light radiated from the LEDs 20 and light radiated from the LEDs 21 fade in. Moreover, timing, with which the turning on of the LEDs 20 is started, is made to differ from timing with which the turning-on of the LEDs 21 is started. Consequently, the embodiment achieves the illuminating manner, which provides a high degree of a presentation effect, by manipulatively combining the change in the luminance with the change in the tone color. Thus, a change in the tone of light as would be seen at a sunrise, that is, a change in the tone of light from that of light in red-tinged atmosphere like that of light of a morning glow to that of light in white-tinged atmosphere like that of day-light can be represented.

On the other hand, a turning-off control operation of the controller 80 is performed by changing a state, in which one of the doors 70 is opened, to a state in which all the doors 70 are shut. That is, when detecting that all the door switches 71 are in OFF-state, the controller 80 first starts turning off the second LEDs 21. The turning-off of the second LEDs 21 is performed so that the light intensity thereof gradually decreases in a predetermined time period between the time t4, at which the turning-off thereof is started, and the time t6. On the other hand, the turning-off of the first LEDs 20 is commenced after the lapse of a predetermined time (t4 to t5) since the start t4 of the second LEDs 21. Similarly, the turning-off of the first LEDs 20 is performed so that the light intensity thereof gradually decreases in a predetermined time period between the time t5, at which the turning-off thereof is started, and the time t7.

The aforementioned turning-off control operation results in that during the predetermined time (t4 to t5) since the start t4 of the turning-off of the second LEDs 21, only the light intensity of the second LEDs 21 decreases and the light intensity of the illuminating light gradually decreases and the ratio of the light intensity of white light to that of the entire illuminating light increases. Consequently, the color tone of the illuminating light becomes darker or deeper. After the lapse of the time t5, the amount of light radiated from the first LEDs 20 starts decreasing. Both the light intensity of the first LEDs and that of the second LEDs gradually decrease until the time t6. Consequently, in a time period between the time t5 and the time t6, the color tone of the illuminating light gradually becomes darker. Simultaneously, the luminance decreases. After the lapse of the time t6, the illumination is performed by using only the light radiated from the first LEDs 20. The light intensity of this light decreases with time. Therefore, it is observed that the umber illuminating light gradually goes out by simultaneously decreasing the luminance.

As described above, the first LEDs 20 and the second LEDs 21 are turned off so that both the light radiated from the LEDs 20 and light radiated from the LEDs 21 fade out. Moreover, timing, with which the turning-off of the LEDs 20 is started, is made to differ from timing with which the turning-off of the LEDs 21 is started. Consequently, the embodiment achieves the illuminating manner, which provides a high degree of a presentation effect, by manipulatively combining the change in the luminance with the change in the tone color. Thus, a change in the tone of light as would be seen at a sunset, that is, a change in the tone of light from that of light in white-tinged atmosphere like that of day-light through that of light in red-tinged atmosphere like that of a evening glow finally to that of light in night atmosphere can be represented.

Figure 5A:
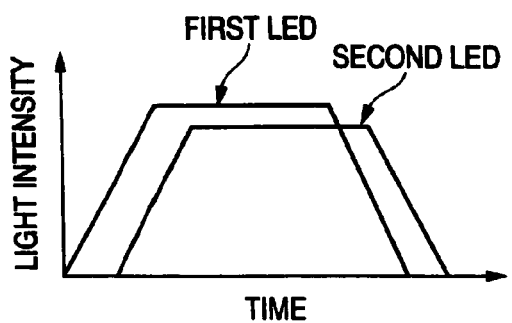
FIGS. 5A to 5E are graphs illustrating other manners of change in the light intensity of each of the first LED 20 and the second LED 21 of the illumination device 1 for a vehicle compartment.

Although the turning-on of the second LEDs 21 precedes that of the first LEDs 20 in the embodiment as a turning-on control operation, conversely, the illuminating conditions of both the first LEDs and the second LEDs may be controlled so that the turning-on of the first LEDs 20 precedes that of the second LEDs 21. Similarly, the illuminating conditions of both the first LEDs and the second LEDs may be controlled so that the turning-off of the first LEDs 20 precedes that of the second LEDs 21 as a turning-off control operation. FIG. 5A shows a time-varying change in the light intensity of both the first LEDs and the second LEDs in the case that such a turning-off control operation is performed. Incidentally, in the case of this example, the highest value of the light intensity of the first LEDs 20 is set to be higher than that of the light intensity of the second LEDs.

Figure 5B:
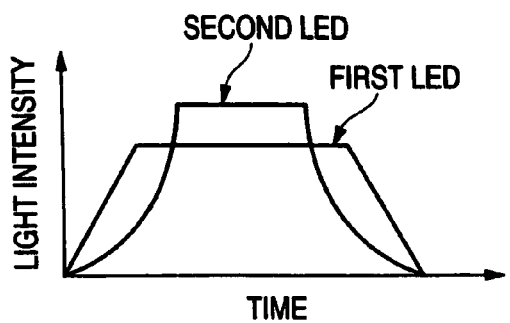

An operation of simultaneously starting the turning-on of the first LEDs 20 and the second LEDs 21 and changing the light intensity of the first LEDs 20 and that of the second LEDs 21 in different manners can be employed as the turning-on control operation. Similarly, an operation of simultaneously starting the turning-off of the first LEDs 20 and the second LEDs 21 and changing the light intensity of the first LEDs 20 and that of the second LEDs 21 in different manners can be employed as the turning-off control operation. FIG. 5B shows examples of performing such turning-on and turning-off control operations.

Figure 5C:
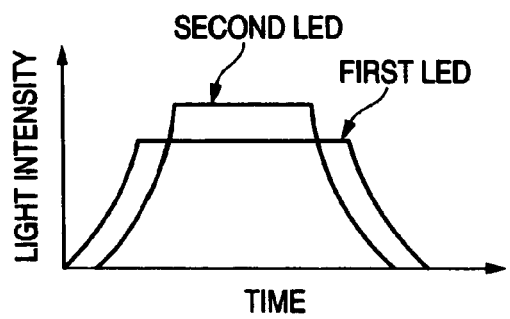
Figure 5D:
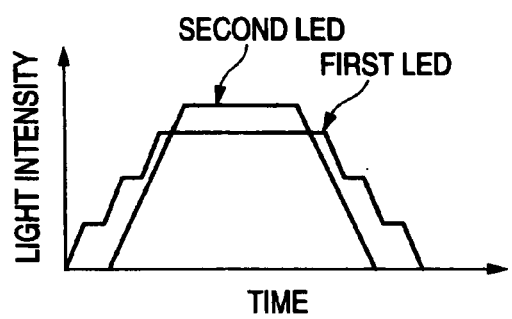

Meanwhile, the manners in change of the light intensity of each of the LEDs at the turning-on and the turning-off thereof are not limited to specific ones. In addition to the linear change in the light intensity as illustrated in FIG. 4, for example, an exponential or a stepwise increase (or decrease) may be employed as the manner of change in the light intensity. FIG. 5C illustrates an example of the case of controlling change in the light intensity of each of the first LEDs 20 and the second LEDs 21 at the turning-on and the turning-off thereof. On the other hand, FIG. 5D illustrates an example of the case of controlling change in the light intensity of each of the first LEDs 20 and the second LEDs 21 at the turning-on and the turning-off thereof. In this case, a linear change is employed as the change in the light intensity of the second LEDs 21 at the turning-on and the turning-off thereof.

Figure 5E:
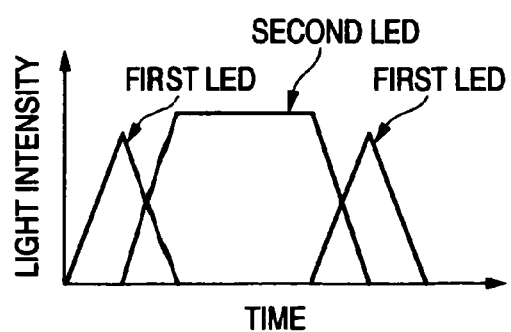

Further, turning-on and turning-off control operations can be performed on the first LEDs 20 and the second LEDs 21 in the manner as illustrated in FIG. 5E. In the case of this example, the following operation is performed as the turning-on control operation. That is, the first LEDs 20 are turned on so that the light intensity thereof gradually increases at an early stage of the turning-on thereof. After the light intensity reaches a predetermined level, the light intensity of the first LEDs 20 is once gradually decreased and then turned off (alternatively, a state, in which the LEDs 20 are turned on at a low light intensity, maybe maintained). The turning-on of the second LEDs 21 is started and the light intensity thereof gradually increases when the light intensity of the first LEDs 20 gradually increases (at an early stage of the turning-on thereof) after the lapse of a predetermined time from the start of the turning-on of the first LEDs 20. Further, the following operation is performed as the turning-off control operation. That is, first, the light intensity of the second LEDs 21 is gradually decreased. Simultaneously with the start of this turning-off of the second LEDs 21, the turning-on of the first LEDs 20 is commenced. Further, the light intensity of the first LEDs is gradually increased. After the light intensity of the first LEDS 20 reaches a predetermined level, the light intensity thereof is gradually decreased and then turned off. Incidentally, the turning-on of the first LEDs 20 may be started after the lapse of a predetermined time from the start of the turning-off of the second LEDs 21.

Meanwhile, in the aforementioned embodiment, only the second LEDs 21 are turned on when the switch 40 is turned on. However, in this case, the weatherstrip can obtain effects, which are similar to the presentation effects of performing the illumination by being linked with an operation of the door switch 71, by controlling the first LEDs 20 and the second LEDs 21 so that the timing, with which the turning-on of the first LEDs 20 is performed, is made to differ from the timing with which the turning-on of the second LEDs 21 is performed, and that the light intensity of each of the LEDs gradually increases at an early stage of the turning-on thereof. Furthermore, a presentation similar to that in the case of performing the illumination by being linked with an operation of the door switch 71 can be performed by controlling the first LEDs 20 and the second LEDs 21 so that the timing, with which the turning-off of the first LEDs 20 is performed, is made to differ from the timing with which the turning-off of the second LEDs 21 is performed, and that the light intensity of each of the LEDs gradually decreases.

The invention is not limited to the aforementioned embodiment. The invention includes various modifications made without departing from the scope of the invention and within a range of modifications easily occurs to those skilled in the art.

What is claimed is:

1. An illumination device for a vehicle compartment, comprising:
   a first light source;
   a second light source, a luminous color of which is different from a luminous color of said first light source; and
   a controller for controlling an illuminating condition of each of said first light source and said second light source,
   wherein said controller turns on said first light source so that light intensity of said first light source gradually increases at an early stage of a turning-on operation of said first light source, and
   wherein said controller switches said second light source from an off condition to an on condition while the light intensity of said first light source gradually increases after a lapse of a predetermined time from starting said turning-on operation of said first light source.

2. The illumination device for a vehicle compartment according to claim 1, wherein said controller switches said second light source such that light intensity of said second light source gradually increases at an early stage of a turning-on operation of said second light source.

3. The illumination device for a vehicle compartment according to claim 1, wherein the luminous color of said second light source comprises white.

4. The illumination device for a vehicle compartment according to claim 1, wherein at least one of said first light source and said second light source comprises a light emitting diode.

5. The illumination device for a vehicle compartment according to claim 1, wherein said controller controls the light intensity of the first and second light sources directly in an electrical manner.

6. The device of claim 1, wherein said controller turns on said first light source such that said first light source switches from an off condition to an on condition.

7. The device of claim 1, wherein said light from said first light source mixes with light from said second light source to form a mixed light which is emitted from said illumination device, a color of said mixed light appearing to change over time.

8. An illumination device for a vehicle compartment, comprising:
   a first light source;
   a second light source, a luminous color of which is different from a luminous color said first light source; and
   a controller for controlling an illuminating condition of each of said first light source and said second light source,
   wherein said controller turns off said second light source, so that a light intensity of said second light source gradually decreases, and
   wherein said controller switches said first light source from an on condition to an off condition while the light intensity of said second light source gradually decreases after a lapse of a predetermined time from starting of turning-off of said second light source.

9. The illumination device for a vehicle compartment, according to claim 8, wherein said controller switches said first light source such that light intensity of said first light source gradually decreases.

10. The illumination device for a vehicle compartment according claim 8, wherein the luminous color of said second light source comprises white.

11. The illumination device for a vehicle compartment according to claim 8, wherein at least one of said first light source and said second light source comprises a light emitting diode.

12. The illumination device for a vehicle compartment according to claim 8, wherein said controller controls the light intensity of the first and second light sources directly in an electrical manner.

13. The device of claim 8, wherein said controller turns off said second light source such that said second light source switches from an on condition to an off condition.

14. An illumination device for a vehicle compartment, comprising:
   a first light source;
   a second light source, a luminous color of which is different from a luminous color of said first light source; and a controller for controlling an illuminating condition of each of said first light source and said second light source, wherein said controller performs a turning-on control by turning on said first light source such that a light intensity of said first light source gradually increases at an early stage of a turning-on operation of said first light source, and by switching said second light source from an off condition to an on condition while the light intensity of said first light source gradually increases after a lapse of a predetermined time from starting of turning-on of said first light source, whereby a light intensity of said first light source gradually increases at an early stage of a turning-on operation of said second light source, and wherein said controller performs a turning-off control by turning off said second light source such that a light intensity of said second light source gradually decreases, and by switching said first light source from an on condition to an off condition while the light intensity of said second light source gradually decreases after a lapse of a predetermined time from starting a turning-off of said second light source, whereby light intensity of said first light source gradually decreases.

15. The illumination device for a vehicle compartment according to claim 14, wherein the luminous color of said first light source comprises a chromatic color, and wherein the luminous color of said second light source comprises white.

16. The illumination device for a vehicle compartment according to claim 14, wherein at least one of said first light source and said second light source comprises a light emitting diode.

17. The illumination device for a vehicle compartment according to claim 14, wherein said controller controls the light intensity of the first and second light sources directly in an electrical manner.

* * * * *